United States Patent

[11] 3,613,550

| [72] | Inventor | Neal W. Thompson<br>Monroeville, Pa. |
|---|---|---|
| [21] | Appl. No. | 747,760 |
| [22] | Filed | July 1, 1968 |
| [45] | Patented | Oct. 19, 1971 |
| [73] | Assignee | Small Business Administration<br>Continuation-in-part of application Ser. No. 665,478, Sept. 5, 1967, now abandoned. |

[54] APPARATUS FOR COOKING FOODSTUFFS
12 Claims, 8 Drawing Figs.

[52] U.S. Cl.................................................. 99/330,
99/107, 99/333, 99/408, 99/416
[51] Int. Cl........................................................ A47j 37/12
[50] Field of Search.......................................... 126/369;
99/107, 330, 331, 332, 333, 403, 407, 408, 416, 336

[56] References Cited
UNITED STATES PATENTS

| 2,827,379 | 3/1958 | Phelan | 99/107 |
|---|---|---|---|
| 3,187,664 | 6/1965 | Jennings | 99/407 UX |
| 3,194,662 | 7/1965 | Nelson | 99/403 UX |
| 3,210,193 | 10/1965 | Martin | 99/336 UX |
| 3,245,800 | 4/1966 | Sanders | 99/107 |
| 3,259,521 | 7/1966 | Crall | 99/408 X |
| 3,280,722 | 10/1966 | Rahuaser | 99/332 |
| 3,364,845 | 1/1968 | Wilson et al. | 99/407 X |
| 3,431,834 | 3/1969 | Keathley et al. | 99/336 |
| 3,466,997 | 9/1969 | Hartzog | 99/407 X |
| 3,501,316 | 3/1970 | Guthrie | 99/107 |
| 3,071,063 | 1/1963 | Churley | 99/332 |
| 3,314,416 | 4/1967 | Wagner | 126/369 |
| 3,431,835 | 3/1969 | Angold | 99/408 |

*Primary Examiner*—Billy J. Wilhite
*Attorney*—Parmelee, Utzler & Welsh

ABSTRACT: A method of and apparatus for cooking foodstuffs by immersing them in a heated liquid cooking medium contained in a pressure vessel, closing the vessel and relieving the pressure therein when it reaches a predetermined high limit at which point the burners turn off and the timing cycle begins. The pressure is relieved to a low limit at which point the burners are turned on. The cycle is repeated until the foodstuffs are cooked. The cooking medium is then discharged from the vessel under the urging of the pressure of the steam remaining in the vessel. Upon complete discharge of the cooking medium, the vessel is completely vented of residual steam. The discharged cooking medium, if desired, is filtered of all solid residue and is then ready for reuse.

INVENTOR
Neal W. Thompson

INVENTOR
Neal W. Thompson

INVENTOR

Neal W. Thompson

INVENTOR
Neal W. Thompson

APPARATUS FOR COOKING FOODSTUFFS

This application is a continuation-in-part of my pending U.S. Pat. application Ser. No. 665,478, filed Sept. 5, 1967, now abandoned.

This invention relates to apparatus for cooking foodstuffs and particularly to apparatus for cooking foodstuffs in a liquid cooking medium under pressure.

A well-known method of preparing certain foodstuffs, such as chicken, seafood, various kinds of meats, and the like is to immerse these foodstuffs in hot shortening or fat and cook the foodstuffs until done. This type of food preparation is commonly called deep frying. Establishments handling large quantities of food often resort to such deep frying under pressure. Pressure-type deep frying permits the food to be prepared in relatively short time as compared to open-type deep frying. One problem is common to both the open type and pressure type of deep-frying systems, namely, the shortening or fat has a limited useful life and must be completely replaced at regular intervals. The reason for this limited life is that after a certain period of use the fat breaks down, characterized by foaming, a dark amber color, off flavor, smoking, and formation of gums and residues. This breakdown of the fat is due to the chemical formation therein of a high degree of free fatty acids. These adverse and destructive free fatty acids have been attributed to the breakdown of the chemical bond between the glycerine and fatty acids which make up the fat. This breakdown is due mainly to hydrolysis, the presence of contaminating impurities in the fat, and sustained use of impurity-contaminated fat at high temperatures. The impurities often found in the fat are derived in large part from the food being prepared. For example, chicken during deep frying will release, among other things, a product commonly called glue. Residual blood remaining in the chicken may also be released. In addition to the glue and blood, flour, bread particles, salt, spices and the like forming parts of the covering or breading applied to the chicken will also enter into the fat as part of the total impurities. Straining and filtering of the fat helps to add to the effective life of the fat. However, most of the filtering systems, aside from being elaborate, expensive, and awkward cannot effectively prevent breakdown of the fat since the destructive free fatty acids are formed, while the fat is being used at high temperatures to fry food and remain in solution with the fat and cannot be filtered out. Oftentimes the fat is not permitted to be used until it completely breaks down but is replaced on a regular basis, usually on the basis of change in color. The reason for this is that the contaminated fat, if not replaced, will give the food an undesirable off flavor and unattractive appearance, and this is attributed to the high degree of free fatty acids in the fat, and the adhesion of carbon particles already formed, as well as the other suspended impurities to the foods. In addition to causing breakdown of the fat, the impurities transfer an odor or off flavor to the fat, such odor or off flavor being characteristic of the particular food being prepared. For example, the fat used for preparing chicken would smell like the chicken. Odorous fat cannot be used in preparing other foods due to the danger of the odor of one food being transferred to the other food (viz fishy-smelling chicken).

The rate of formation of free fatty acids due to the presence of impurities and moisture in the fat is accelerated when the fat is used at sustained high temperatures. Accordingly, the temperature of the fat is kept relatively low during cooking (e.g. 325° to 350° F.). The cooking time for the food product is necessarily lengthened as compared with fat used at higher temperatures.

As mentioned earlier, hydrolysis is a cause of fat breakdown and is due to excess water in the fat. An excessive amount of water in the fat also results in rapid generation of steam as the fat is heated to high temperatures. This rapid generation of steam causes violent sputtering which is dangerous to anyone who might be near an open fryer. The sputtering caused by the generated steam also carries some of the fat away to be thus wasted. In order to avoid sputtering by generated steam when deep frying refrigerated foods, a common practice has been to preheat or blanch the refrigerated foods to drive off some of its moisture. Aside from necessitating an additional procedure in preparing these refrigerated foods, this preheating is unsanitary and can result in food contamination. Some states have recognized this unsanitary danger of preheating refrigerated foods by prohibiting restaurants and the like from preheating refrigerated foods prior to cooking.

Water also plays an important favorable role in deep-frying operations and particularly in pressure deep frying. The steam generated from the moisture in the foods being fried circulates through the fat and contacts the food to restore the lost moisture thereby resulting in a tender, moist and tasty food product. An additional problem arises here, however, and especially in pressure frying in that the steam, if not properly controlled, can cause the food to become overcooked. In the case of chicken, for example, the meat can fall away from the bones if overcooked. If the steam is generated too rapidly in open deep drying, and thereby not permitted to circulate about the food, the food will tend to char since it will be getting too much heat too fast. Therefore, the temperature of the fat during cooking cannot be raised too high.

One other problem common to both open-type and pressure-type deep frying is that the food product absorbs and retains a certain amount of fat which detracts from the taste of the food as well as being another source of fat waste. The amount of fat absorbed by the food product increases as the length of cooking time increases. The cooking times currently used are unnecessarily long because of the necessity of using low fat temperatures, as indicated previously. Conscientious restaurants oftentimes use a degreaser or defatter for removing the residual fats in the food products. Degreasing adds a time-consuming step to the food-processing procedure, with the degreasers or defatters having the additional disadvantages of being expensive and bulky.

Pressure-type deep fryers are always explosion problems, especially if operated at very high pressures such as above 35 p.s.i.g. Furthermore, the food product resulting from the use of the pressure fryers extant are not satisfactory, due mainly to the water and impurities mentioned earlier. The dissatisfaction with high-pressure fryers is demonstrated by the scarcity of use of these known pressure fryers.

The pressure deep fry systems commonly used are also limited in the amount of food product which can be prepared in individual vessels. One process extensively used is limited in the amount of food prepared in each container to about 5 pounds. This limited capacity has necessitated the use of a large amount of containers individually heated on open gas burners in order to meet the demand for food product. After the food is prepared by this process, the individual container is opened, fat-laden steam is released, and the container hand carried to a strainer vat and dumped of all its contents. The fat-soaked finished food product is then put into a defatter before being served. Needless to say, the just-described process is inefficient, wasteful of valuable cooking fat, dangerous to operators who have to open the containers and carry them to the strainer vats, very expensive to operate, and other deficiencies too numerous to mention.

Pressure cooking is also used for preparing other food products, such as stewed chicken, pot-roasted beef, vegetables, and dough products, for example, with water being used as the cooking medium. The water is either discarded or used as gravy stock, in the case of meats, after the cooking of the products is completed. In the case of pressure cookers used to date, any contaminating foreign matter on the products tends to recirculate about the cooking vessel and either remain on the product, in the water, or on the walls of the vessel. In other words, there is no way for foreign matter to escape from the cooking vessel during cooking.

I have overcome the problems indigenous to the commonly used deep-frying cookers and to pressure cookers using water as a cooking medium by providing a new apparatus for cooking foodstuffs. My apparatus results in a rapidly prepared food product which is clean, tasty, tender, free from residual cooking medium and appetizing in appearance. When shortening is used as the cooking medium there is very little loss of the shortening due to sputtering and/or adherence to the food and, more importantly, the shortening discharged from the vessel is free of a large portion of deleterious free fatty acids which would otherwise react to break it down and to give the shortening the odor of the food being prepared. The shortening can thus be reused with different food without danger of transferring odorous compounds from one food to another. Moreover, the discharged shortening can be reused over an indefinite period of time at a considerable savings in operating costs. When either shortening or water is used as the cooking medium a large portion of lightweight foreign matter which may have been on the surface of the food or in the cooking medium is removed during the pressure-relieving steps. Thus, the product, cooking medium and cooking vessel emerge clean after the completion of the cooking cycle. The water cooking medium can, if desired, be either used as stock for gravy, in the case of cooking meats in water, or discarded. Additionally, my apparatus is more than reasonably safe since it can be operated at a relatively low pressure as compared to the pressure-cooking systems known today. Finally, my apparatus can be used with small or large quantities of foodstuffs and provides a thoroughly and uniformly cooked product throughout the entire mass of product in the cooking vessel.

The apparatus of my invention, comprises, preferably, a sealable pressure vessel having a pressure vent at an upper portion thereof and a discharge port at a lower portion thereof for discharging cooking medium therefrom; heating means for heating cooking medium contained by the vessel; pressure-regulating means responsive to pressure in the vessel for opening the pressure vent when the pressure in the vessel reaches a predetermined high pressure and for closing the vent when the pressure in the vessel is decreased from the high pressure to a predetermined low pressure; timing means operable with the heating means for preselecting the time period of cooking and responsive to the pressure in the vessel for beginning the cooking period when the pressure in the vessel first reaches the predetermined high pressure; and control means responsive to the pressure in the vessel during the cooking period for turning the heating means off when the high pressure is reached and for turning the heating means on when the pressure in the vessel is decreased to the predetermined low pressure.

Other details, objects and advantages of the invention will become apparent as the following description of a present preferred embodiment thereof proceeds.

In the accompanying drawings, I have shown a present preferred embodiment of the invention which:

Figure 1:
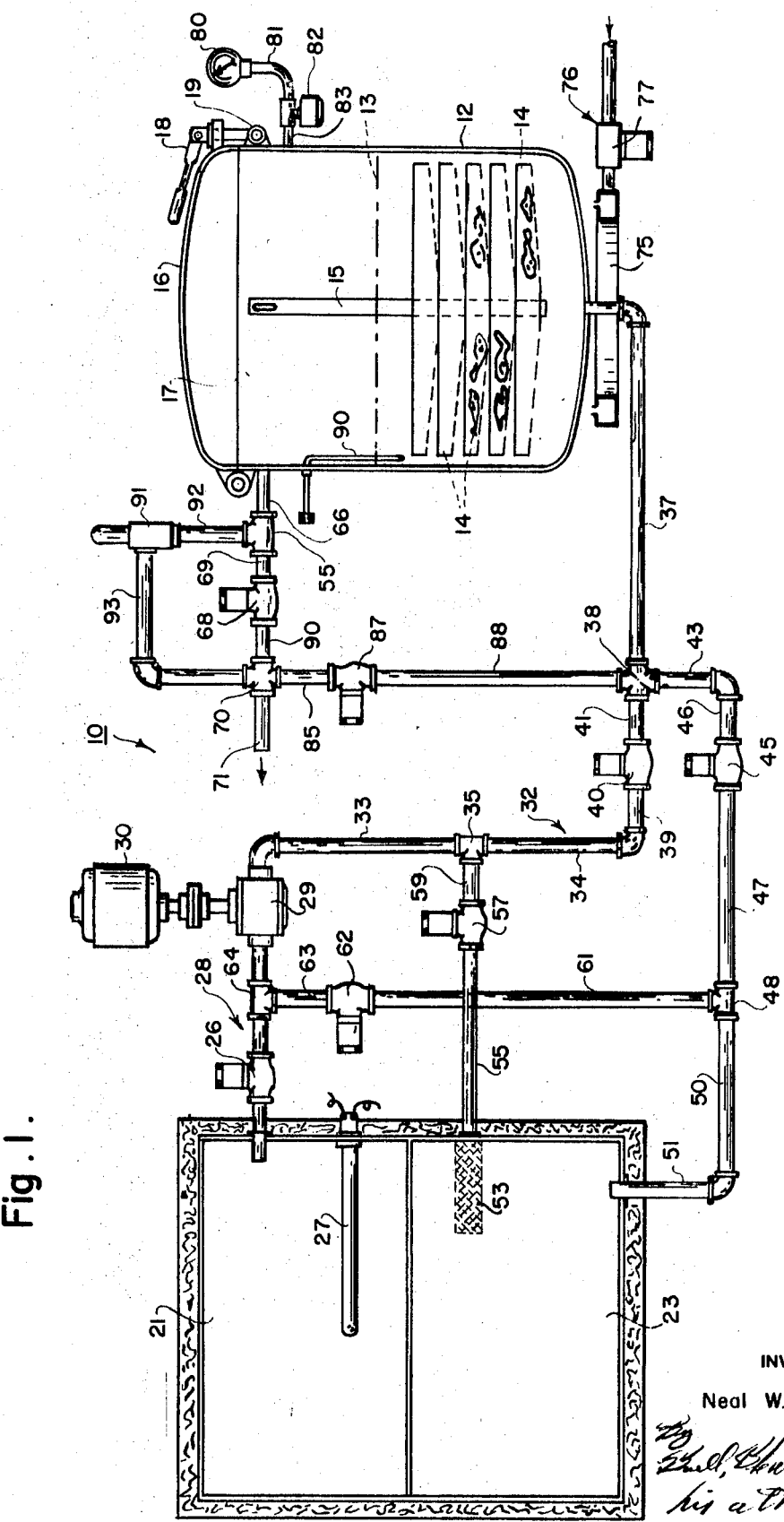
FIG. 1 is a side elevational view partly in section and partly diagrammatical of one pressure-cooking system for practicing the present invention.

Referring now to the drawings wherein like reference numerals refer to like parts throughout the views, 10 generally represents one embodiment of a pressure-type deep fry system for practicing the present invention. For purposes of clarity of description the deep fry system 10 will be considered as a system for preparing chicken sections by using the familiar, nonaqueous vegetable shortening or fat as the cooking medium. The shortening will hereinafter be called fat. As illustrated, the deep fry system 10 includes a generally cylindrical high-pressure, large-capacity (viz. 45 gallons, for example) cooking vessel 12 for suitably containing hot fat 13. Vessel 12 is suitably internally adapted for receiving and supporting mesh trays 14 (five shown) containing pieces of chicken and suitably tandomly stacked on a support rod 15. Vessel 12 is adapted to be closed in a pressuretight condition by cover 16 suitably pivotably mounted on vessel 12. Cover 16 carries a gasket 17 or the like, which when pressed down against the upper edge of the vessel 12 provides a seal capable of withstanding relatively high pressures. The cover 16 is securely fixed in place with vessel 12 by a plurality of lever-type toggle clamps 18, one illustrated, pivotably supported and circumferentially spaced about an upper portion of vessel 12, which clamps 18 engage yokelike lugs 19 fixed on cover 16.

Vessel 12 communicates through suitable plumbing with a pair of juxtaposed storage containers 21 and 23 formed preferably from stainless steel sheet and suitably heat insulated. Container 21 is used for storing clean fat preparatory to use thereof in a deep fry cycle, to be illustrated hereinafter. A cloth filter or the like can cover the bottom of the interior of container 21 for absorbing any fine particulate matter in the fat. An electrical immersion heater 27 suitably connected to a source of electricity is positioned in the container 21 for heating the fat therein. Plumbing 28 extends between a lower portion of container 21 and a double-acting pump 29 driven by a reversible electrical motor 30 suitably connected to a source of electrical power. A solenoid-operated valve 26 is disposed in plumbing 28 between container 21 and pump 29. Pump 29 communicates through its output side with vessel 12 through plumbing 32 which includes pipes 33 and 34 coupled by two ends of Tee connection 35. The remainder of plumbing 32 includes a length of pipe 37 suitably connected with vessel 12 at the bottom thereof, which pipe 37 extends to one end of four-way coupling 38. Pipe 34 is suitably connected by a length of pipe 39 to a solenoid-operated valve 40 which in turn is suitably connected to an end of coupling 38 by pipe 41. The valve 40 is arranged to permit flow from the pump 29 to and from vessel 12 as will be described hereinafter. Vessel 12 communicates with container 23 through pipe 37, four-way coupling 38, pipe 43 connected with coupling 38, and then through solenoid operated valve 45 connected at one end to a pipe 46 and at the other end to a length of pipe 47 which in turn is suitably connected with one end of a Tee connector 48 and then through a pipe 50 and 51 to a lower end portion of container 23. Container 23 receives the fat from vessel 12 after the cooking cycle is completed, as will be fully described hereinafter. The fat will be put into container 21 so that it may be reused for another cooking cycle. The fat will, however, be filtered of residual particulate matter before being put into container 21. A mesh strainer 53 preferably made of stainless steel is suitably fixed in the container 23 through a lower portion thereof. A length of pipe 55 extends from strainer 53 to a solenoid-operated valve 57 arranged to open when filling container 21 with the fat from container 23. Another length of pipe 59 extends from valve 57 to Tee connector 35. Solenoid valve 57 is arranged to only permit flow from container 23 to container 21.

A length of pipe 61 extends from Tee connector 48 to a solenoid-operated valve 62 which in turn is suitably connected by pipe 63 to a Tee connector 64 disposed in plumbing 28.

A steam vent line 66 extends outwardly from an upper portion of vessel 12 and extends to a Tee connection 55 which in turn is connected by a short section of pipe 69 to a solenoid-operated valve 68 which in turn is connected by a section of pipe 90 to one end of a four-way coupling 70. A length of pipe 71 is connected to another end of four-way coupling 70, which pipe 71 is open to a sewer line, not shown. The solenoid-operated valve 68 is set to open by means, to be described later, when the pressure in vessel 12 reaches about 15 p.s.i.g. and to close again when the pressure in vessel 12 is relieved from 15 p.s.i.g. to about 10 p.s.i.g. A length of pipe 85 is suitably connected between coupling 70 and solenoid-operated valve 87 which in turn is connected to a length of pipe 88 which is connected to one end of four-way coupling 38.

A safety relief valve 91 is connected at one end thereof by pipe 92 to Tee connector 55 and at the other end thereof to a plumbing 93 which is suitably connected to four-way coupling 70.

The fat in vessel 12 is heated before the cooking cycle begins and during the cooking cycle while the pressure in the vessel is building up. The heating of the fat in vessel 12 is provided by gas burners 75 suitably connected to a source of gas through plumbing 76. The flow of gas to the burners 75 is regulated by regulating valve 77 suitably connected with plumbing 76.

A pressure gauge 80 for indicating the pressure in vessel 12 is connected by pipe 81 through a pressure switch 82 which in turn is connected to pipe 83 communicating with the interior of vessel 12 through an upper portion thereof. Pressure switch 82 is arranged to relay signals for closing regulating valves 77 when the pressure in vessel 12 reaches about 15 p.s.i.g. and for opening valve 77 when the pressure in vessel 12 is decreased to about 10 p.s.i.g. Thus, the burners 75 will be on while the pressure in vessel 12 is building up to 15 p.s.i.g. and off both when the pressure reaches about 15 p.s.i.g. and during the relieving of the pressure to about 10 p.s.i.g. The burners 75 come on again at 10 p.s.i.g. Pressure switch 82 also is arranged to provide electrical signals to solenoid valve 68 for opening and closing same at about 15 p.s.i.g. and about 10 p.s.i.g. respectively. Thus, steam, some impurities, and some fat containing a high incidence of free fatty acids will be relieved from vessel 12 through pipes 66 and 71 when the pressure in vessel 12 builds up to about 15 p.s.i.g. and will continue to be relieved until the pressure in vessel 12 decreases to about 10 p.s.i.g.

A thermocouple 90 of any well-known type is suitably supported by vessel 12 and is positioned for immersion in the fat 13. Thermocouple 90 is electrically connected with regulating valve 77 through a suitable controller, not shown, for regulating the flow of gas to the burner 75 and to thereby control the temperature of fat 13 in vessel 12.

Figure 2:
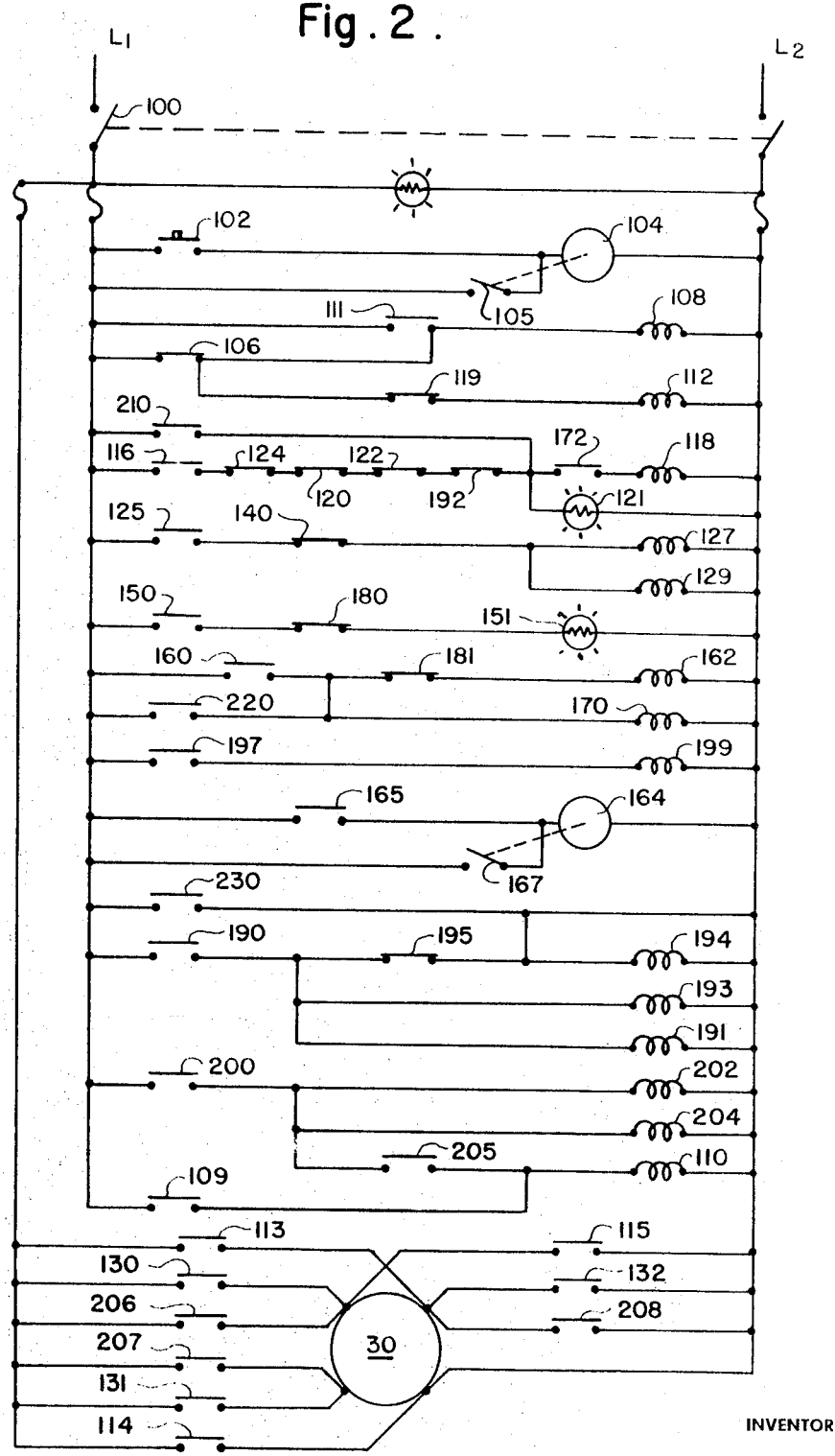
FIG. 2 is a schematic representation of a typical control system for use with the present invention.
Figure 3:
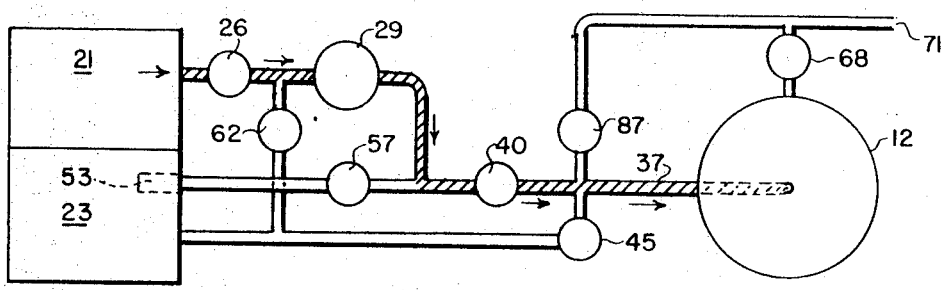
FIGS. 3–7 show schematic representations of foodstuffs being prepared in accordance with the present invention.
Figure 4:
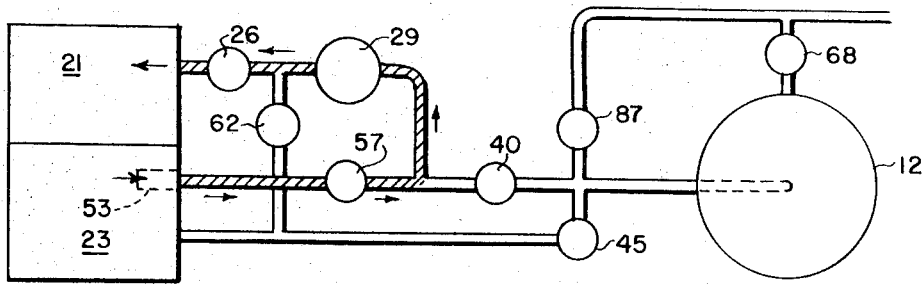

The operation of the apparatus of the present invention is preferably performed automatically. The control circuitry shown schematically in FIG. 2 is representative of a circuit which can be used for automatic operation of the present invention. A typical cooking cycle of chicken sections will best illustrate one operation of the cooking system of the present invention. The chicken to be prepared is suitably breaded and placed on the mesh trays 14 which in turn are put on support rod 15. The fat in container 21 is heated to a desired temperature by turning on the electric power to heater 27. The fat in container 21 is raised to a temperature sufficient to drive off moisture to thereby prevent oxidation of the fat. A suitable temperature would be about 250° F. If the fat were already at or above 250° F. no additional heating would be needed. Assuming then that the temperature of the fat is heated to 250° F. and when this temperature of fat is reached, the main power switch 100 is turned on. At this juncture, it should be noted that in this illustrative description container 23 contains fat which was used in a completed cooking cycle and was directed into container 23 in a manner to be described hereinafter. Pump 29 is activated for pumping fat from container 21 to vessel 12 by closing switch 102 which energizes timer 104 thus closing holding switch 105 thereby causing switch 106 to close, to thereby energize motor 30 which then drives pump 29. Timer 104 is a cam-type program timer set for the total pumping time necessary to pump the fat from container 21 to vessel 12. The amount of fat to be pumped into vessel 12 is determined by the amount necessary for cooking the maximum capacity of chicken in the vessel 12. For example, approximately 175 pounds of fat heated to about 425° F. would be needed here to cook between 60–80 pounds of chicken sections in about 11 minutes. It should be made clear, however, that this same 175 pounds of fat heated at a temperature below 425° F. can be used to cook lesser amounts of chicken by virtue of the present invention. Returning to the operation of the invention, the contacts of switch 106 remain closed and thereby energize the coils 108 and 110 of valves 26 and 40, respectively. A control relay 112 is also energized which in turn causes contacts 109, 113, 114 and 115 to close to energize pump motor 30 to thereby rotate pump 29 for filling vessel 12 with fat. After a preselected period of time, contacts in timer 104 open to thus deenergize coils 108 and 112 whose contacts 109 open to deenergize coil 110, thus opening contacts 113, 114, and 115 to thereby stop pump motor 30 at which time the vessel 12 is filled with the desired amount of fat 13. A short time (viz. 15 seconds) after the cam contacts 106 in timer 104 open, cam contacts 116 also in cam program timer 104 close to energize solenoid 118 to open main valve 77 in gasline 76 for permitting gas flow to burners 75. Main valve 77 is controlled for on-off operation by temperature controller 120 set at cooking temperature, to be elaborated upon later, and is supervised by pressure limit switch 124 and high-temperature limit switch 122 suitably connected to thermocouple 90. A flame failure burner protection is provided by a well-known type of thermoelectric thermocouple and valve, not shown. A suitably colored light 121 indicates that burners 75 are on. A short time (viz. 15 seconds) after the contacts 116 of timer 104 close, cam contacts 125 also in cam program timer 104 close to energize the coils 127 of solenoid valve 57 and control relay 129 whose contacts 111 and 119 close to energize coil 108 of solenoid valve 26 with powering relay 112. Control relay 129 is also energized to close contacts 130, 131, and 132 to reverse the direction of rotation of motor 30 and accordingly, pump 29 to thus pump fat from container 23 to container 21. During the transfer of fat between containers 23 and 21, the fat is filtered of virtually all particulate matter by passing through filter 53. After a predetermined period of time after the closing of the contacts 125 of timer 104 contacts 140 of timer 104 open to deenergize coils 127 of valve 57 and relay 129 to deenergize coil 108 of valve 26 by opening contacts 111. Control relay 129 is likewise deenergized, opening contacts 130, 131 and 132 to thereby stop pump motor 30. The storage container 21 and vessel 12 now hold fat while container 23 is empty. This sequence of filling vessel 12 with heated fat from container 21 and filling container 21 with filtered fat from container 23 is illustrated diagrammatically in FIGS. 3 and 4.

Continuing with the operation of the invention, a temperature switch 150 closes at a preset temperature setting (cooking temperature) at which time signal light 151, comes on and this indicates that the vessel 12 can now be loaded with chicken. The tray 14 supported chicken is then placed in vessel 12 so that all the chicken is immersed in the fat 13. The cover 16 is then clamped shut to thereby seal vessel 12. The time for cooking a food product after vessel 12 is sealed is dependent on the amount of food to be prepared—more food requires more time—as well as the nature of the food (viz chicken would be cooked longer than certain seafoods). Similarly, the cooking temperature, mentioned previously, of the fat 13 is also dependent on the nature and amount of food to be prepared. The cooking temperature, set before sealing vessel 12, would be about 425° F. for example, with 60–80 pounds of chicken to be cooked. More or less chicken would require the fat temperature to be accordingly increased or decreased. It is preferably, however, not to raise the temperature of the fat above 500° F. Likewise, the browning time, as the total cooking time, will vary with the amount of product, nature of product, desired color of browning, and the like. With the vessel 12 sealed, the internal pressure will build up due to the generation of steam from the chicken. The temperature of the fat will also decrease. When the internal pressure reaches about 15 p.s.i.g. the contacts of pressure switch 160, forming part of pressure switch 82, close and powers control relay 162 which in turn energizes cooking timer 164 through contacts 165. Holding switch 167 is closed to maintain power to cooking timer 164. At this juncture of operation, the actual pressure cooking begins. The pressure switch 160 energizes coil 170 of solenoid valve 68 to thereby open valve 68 to release to sewer a certain amount of steam and impurities, including free fatty acids, driven from the chicken to thereby decrease the internal pressure of vessel 12. At the same time as coil 170 is energized, contacts 172 open to deenergize coil 118 of main gas valve 77 to thereby close off the gas supply to burners 75 to cease heating of fat 13. The pressure continues to decrease to about 10 p.s.i.g. at which point pressure switch 160 deenergizes coil 170 to close valve 68. At the same time as coil 170 is deenergized contacts 172 close to energize coil 118 of main gas valve 77 to open the gas supply to burners 75 and resume heating of fat 13. This cycle repeats itself throughout the cooking of the chicken. The venting of the steam between 15 p.s.i.g. and 10 p.s.i.g. results in an elimination of some impurities urged out of the chicken during cooking and some free fatty acids formed during cooking. The fat after used for cooking and after being returned to container 21, is the same to the naked senses of sight, taste, smell, and touch as it was before a cooking cycle. Furthermore, the venting of steam reduces the amount of water which can remain in the fat 13, thereby reducing the detrimental effect of hydrolyzing the fat to form free fatty acids. It was noted hereinbefore in the introductory portion of this description the damaging effects that water, impurities, and free fatty acids can have on the cooking fat.

Figure 5:
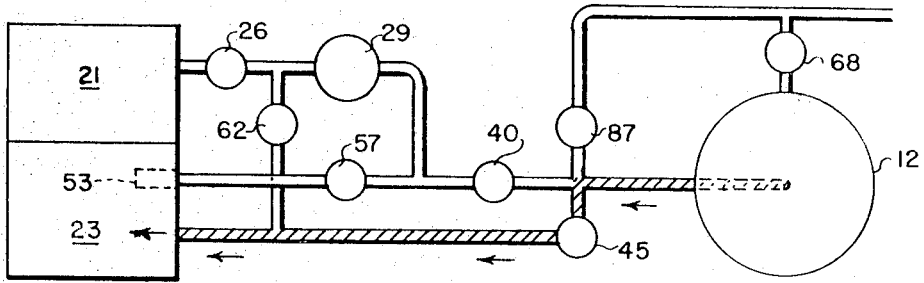
Figure 6:
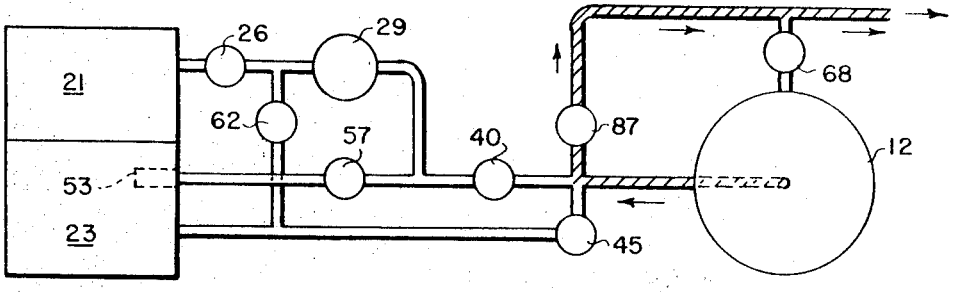

Returning to the operation of this invention, when cooking timer 164 is initially energized it immediately opens contacts 180 to thereby deenergize the light 151, as well as opening contacts 181 to deenergize relay 162 to open contacts 165 to permit timer 164 to cycle out and to open contacts 172 to deenergize coil 118 of main gas valve 77 to thereby close the flow of gas to burners 75. At the end of the cooking cycle cooking timer 164 times out and contacts 190 close energizing relay 191 opening contacts 192 to assure turnoff of burners 75. As noted earlier in the description of the operation, the cooking time is dependent on the nature and amount of food to be prepared and on the temperature of the cooking fat. For example, the timer 164 would be set for 11 minutes for between 60 and 80 pounds of chicken to be cooked at 425° F. initial fat temperature. Less chicken would require a shortened cooking time, as well as a lower cooking temperature. Contacts 190 also energize time delay relay 193 which energizes coil 194 of solenoid valve 45 through contacts 195. The fat 13 is now discharged from vessel 12 under the urging of the internal steam pressure. As the fat 13 passes from vessel 12 to container 23, steam contacts the chicken to drive excessive fat therefrom as well as returning a certain amount of moisture into the chicken. After timer delay relay 193 times out, contacts 197 close to energize coil 199 of solenoid valve 87 to open valve 87 and vent the excess steam from vessel 12 to sewer. At the same time contacts 195 open to deenergize coil 194 of solenoid valve 45 to thereby close valve 45. Thus, as soon as all of the fat is out of vessel 12 the remaining steam is vented to sewer. The discharge of fat 13 from vessel 12 to container 23, and the venting of steam to sewer after discharge of fat, is diagrammatically illustrated in FIGS. 5 and 6. The chicken is now ready to be removed from vessel 12. The cover 16 is unlatched, the trays of chicken removed, and the chicken distributed for consumption as desired.

Figure 7:
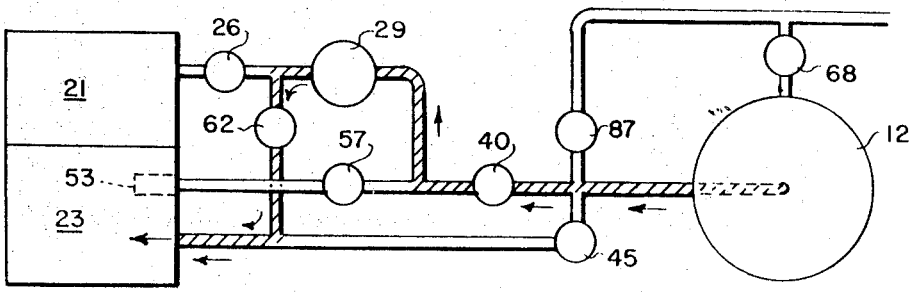

Additional features can be incorporated into the control circuitry. As shown, pushbutton 200 permits removal of fat from the vessel 12 by pump action. Depressing pushbutton 200 energizes coils 202 of solenoid valve 62 and relay 204 which closes contacts 205 powering coil 110 of solenoid valve 40. Valves 62 and 40 are thus opened. At the same time relay 204 is energized to close contacts 206, 207 and 208 to start pump motor 30, and accordingly, pump 29. Thus, as illustrated in FIG. 7, the fat 13 is pumped into container 23. As well as being useful as an emergency discharge means for the fat in the vessel 12, this pumping can be used for removing fat from vessel 12 when cooking certain foods in an open vessel such as potatoes and certain seafoods, for example. A manual selector switch 210 is shown for purposes of providing manual operation of burners 75 by supplying power to energize coil 118 of gas valve 77. The steam in vessel 12 can be manually relieved by actuating switch 220 to supply power to energize coil 170 of solenoid valve 68. Finally, a switch 230 is provided for manual opening and closing of solenoid valve 45 to give a pulsing type of fat discharge from vessel 12. Many variations can be incorporated in the control circuitry for the present invention. Those skilled in the art could readily attest to this. However, it should be clearly understood that the circuitry shown and described herein is only typical and should not be considered as the only circuitry available for the present invention.

The cooked chicken emerges with a crisp coating having browned, appetizing-appearing color. It is uniformly thoroughly cooked to the bone and is moist and tasty. Furthermore, all the chicken is uniformly cooked between the bottommost tray 14 to the topmost tray 14. This extraordinarily cooked product is attributable to regulating the heating of the fat 13 between pressure relieving and the steam content in vessel 12 during the cooking of the chicken. This heat and steam regulation was elaborated upon hereinbefore in the introductory portion of this description. All of the fat is virtually removed from each piece of chicken. Chicken cooked by the present invention can be placed on absorbing paper and removed without leaving a heavy grease spot of the nature which would be left by chicken deep fried by the commonly used deep fry systems. There will be some fat remaining in the chicken prepared by the present invention but the amount of the remaining fat will be very small and just enough to add flavor to the finished chicken.

It has been found that cooking fat used with the present invention can be reused indefinitely at a great cost savings. No unusual change in the fat can be discerned over a prolonged period of use of the original fat. This long fat life is attributable to the removal of some impurities, free fatty acids, and steam from the cooking vessel during cooking and thereby eliminating the major causes of fat breakdown. Furthermore, high temperature (viz. 425° F.) fat can be repeatedly used over long periods of time without danger of subjecting the fat to rapid breakdown. Thus, the food product can be cooked quickly with low fat absorption. It should be carefully noted that the heavier particulate impurities are removed by the filters and not during the pressure relieving. The many other advantages of the present invention have been set out in the earlier portions of this description.

The relieving of the pressure during cooking, as described above, is important for obtaining a well-cooked and clean product, as well as for providing a continuing removing of some impurities including free fatty acids from the cooking vessel and regulating the steam content in the vessel during the cooking period. Although the pressure relieving was described between about 15 p.s.i.g. and 10 p.s.i.g. it is emphasized that other different ranges of pressure relieving can be applied to suit a desired need.

It must be clearly understood that the present invention can be used in cooking any kind of food which can be pressure cooked. The present invention is not to be construed as limited to the cooking of chicken, nor to the quantity of product illustrated, since the present system can be readily adapted to cook very large quantities of food (viz. 2,000–5,000 pounds). The preparing of deep-fried chicken was described purely as an illustration of a typical product capable of being prepared by the present invention. By modifying the system previously described and shown in FIGS. 1–7, I can put water in the cooking vessel 12 and cook food products such as stewed chicken, beans, rice, noodles, peas, pot-roasted beef, potatoes, and many others, too numerous to list. In all cases the cooking cycle is essentially the same, in that the product is immersed in a hot liquid cooking medium, the pressure in the sealed vessel is relieved between two predetermined pressures, the heat turned off during relief and on when relief is stopped and the cooking medium is then discharged at the end of the cooking period. It is to be noted that when I use the word immerse I mean placing the food either wholly or partially into the cooking medium. In one cooking of navy beans, 25 pounds of dry beans were immersed in 11 gallons of boiling water. The beans were cooked for about 5 minutes and during the pressure relieving the steam was trapped, condensed and collected. The beans were thoroughly cooked and very clean.

The collected steam, condensed to water, contained a high incidence of dirt clearly visible to the naked eye.

Figure 8:
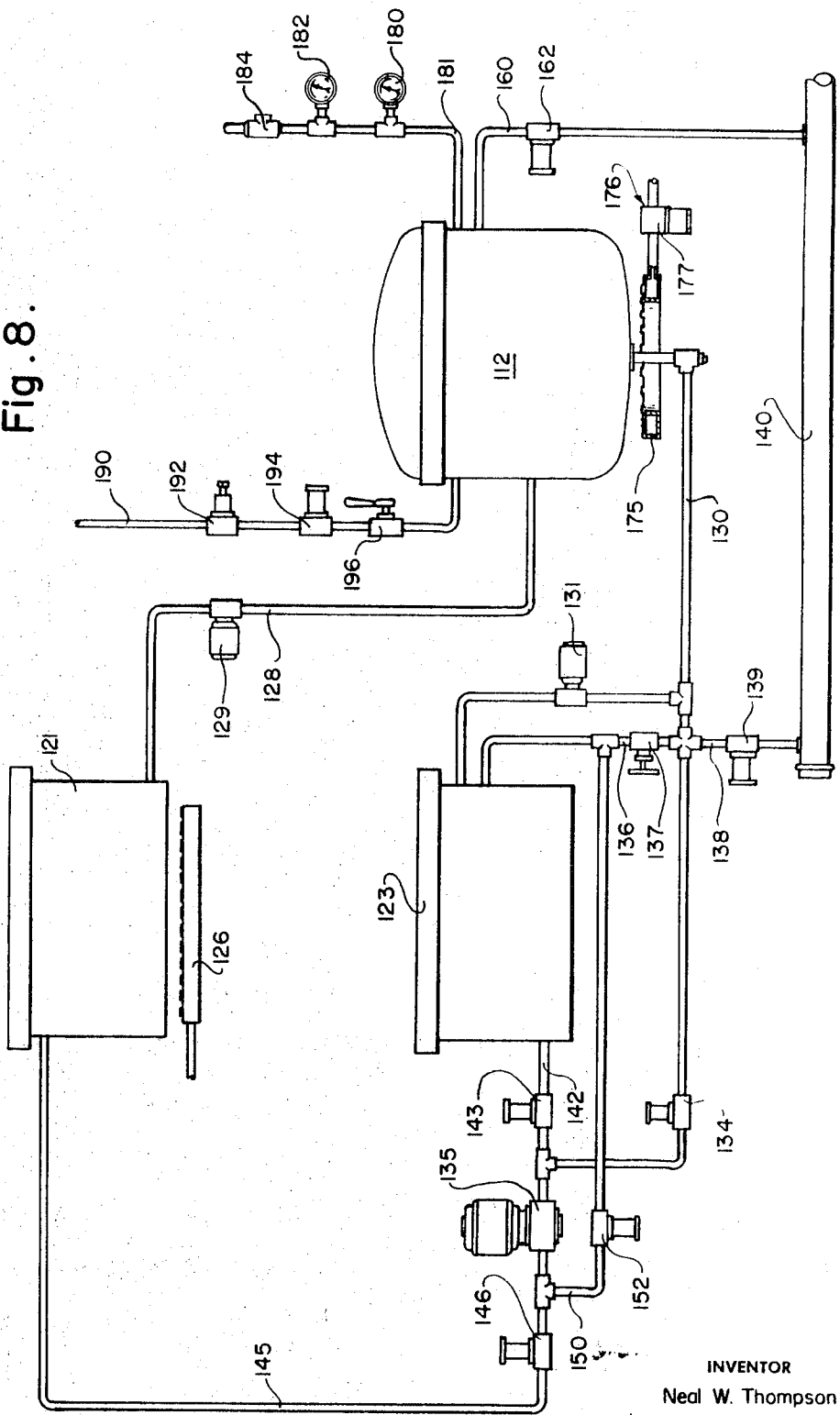
FIG. 8 is a schematic representation of another pressure-cooking system for practicing the present invention.

As well as making the system of my present invention capable of using water or the like, as the cooking medium, further modification can be made wherein my system can selectively use either water or fat as the cooking medium. Such a system is schematically illustrated in FIG. 8, and includes a high-pressure cooking vessel 112 adapted to be closed in a pressuretight condition by cover 116. Vessel 112 communicates through suitable plumbing with a pair of storage containers 121 and 123. Container 121 is used for storing clean fat while container 123 receives and temporarily stores fat used in a previous cooking cycle. Container 123 also houses suitable filter elements, now shown, which serve to remove a large portion of solid particulate matter entrained in the fat during the cooking cycle. A suitable gas heater 126 is arranged externally of container 121 for preheating clean fat prior to passage of such fat to the cooking vessel 112. A line 128 containing a motorized valve 129 communicates between container 121 and vessel 112. Container 121 is arranged with respect to vessel 112 so that clean fat from container 121 can be passed to vessel 112 by gravity. Vessel 112 communicates with container 123 through a line 130 having a motorized valve 131 therein. A line 133 extends from line 130 through a solenoid-operated valve 134 to the inlet of a motor-driven pump 135. A line 136 branches off from line 133 through a manual-operated valve 127 to container 123. Line 138 extends from line 133 through a solenoid-operated valve 139 to a drain line 140. Line 142 extends from container 123 through a solenoid-operated valve 143 to the inlet of pump 135. The outlet of pump 135 is connected to container 121 by line 145 through a solenoid-operated valve 146. The outlet of pump 135 is also connected to container 123 by line 150 branched into line 145 through a solenoid valve 152 and into line 136. Steam is purged to drain 140 from vessel 112 through line 160 having a solenoid valve 162 therein.

The cooking medium in vessel 112 is heated by gas burners 175 connected to a source of gas through line 176. The flow of gas to the burners 175 is regulated by regulating valve 177 suitably connected with line 176.

A pressure gauge 180 for indicating the pressure in vessel 112 is connected by line 181 which also includes a pressure switch 182 and relief valve 184. Pressure switch 182 is arranged to relay signals for closing regulating valve 177 when the pressure in vessel 112 reaches a predetermined high value and for opening valve 177 when the pressure in vessel 112 is decreased to a predetermined low value.

Line 190 is connected between a source of water, not shown, and vessel 112, and contains a suitable pressure regulator 192, a motorized valve 194, and a hand-operated valve 196.

A cooking cycle using either water or shortening can be automatically controlled in the same essential manner as previously described with regard to the embodiment of my system illustrated in FIGS. 1-7. A control circuitry is not described for the system of FIG. 8, but could be readily ascertained by those skilled in this art.

While I have shown and described certain present preferred embodiments of the invention and have illustrated certain present preferred methods of practicing the same, it is to be distinctly understood that the invention is not limited thereto but may be otherwise variously embodied and practiced within the scope of the following claims.

I claim:
1. A pressure cooker comprising: a sealable pressure vessel having a pressure vent at an upper portion thereof and a discharge port at a lower portion thereof for at least discharging cooking medium therefrom; selectively movable lid means arranged on said pressure vessel for opening and closing said vessel; heating means for heating cooking medium contained in said vessel; pressure-regulating means responsive to pressure in said vessel for opening said pressure vent when the pressure in said vessel reaches a predetermined high pressure and for closing said vent when the pressure in said vessel is decreased from said high pressure to a predetermined low pressure; timing means operable with said heating means for preselecting the time period for cooking; and control means responsive to the pressure in said vessel during the cooking period for turning said heating means off when said high pressure is reached and for turning said heating means on when the pressure in said vessel is decreased to said low pressure.

2. A pressure cooker as set forth in claim 1 wherein said pressure-regulating means is responsive to pressure in said vessel for opening said pressure vent substantially simultaneously when the pressure in said vessel reaches a predetermined high pressure and for closing said vent substantially simultaneously when the pressure in said vessel is decreased from said high pressure to a predetermined low pressure.

3. A pressure cooker as set forth in claim 1 including discharge means operable with said timing means for opening said discharge port to discharge cooking medium and residual steam from said vessel at the end of the time period for cooking.

4. A pressure cooker as set forth in claim 1 including discharge means operable with said timing means for opening said discharge port at the end of the cooking period to discharge cooking medium from said vessel under the urging of steam pressure in said vessel; and purge means responsive to a preselected period of time for opening said discharge port after the cooking medium is completely discharged, to vent said vessel of all residual steam therein.

5. A pressure cooker as set forth in claim 1 wherein said timing means is operable with said heating means for preselecting the time period of cooking and for turning off said heating means at the end of the cooking period and is responsive to the pressure in said vessel for beginning the cooking period when the pressure in the vessel first reaches said high pressure.

6. A pressure cooker as set forth in claim 1 wherein said pressure-regulating means is responsive to pressure in said vessel for opening said pressure vent when the pressure in said vessel reaches a high pressure of about 15 p.s.i.g. and for closing said vent when the pressure in said vessel is decreased from about 15 p.s.i.g. to a predetermined low pressure.

7. A pressure cooker as set forth in claim 5 wherein said low pressure is about 10 p.s.i.g.

8. A deep fry pressure-cooking system comprising: a sealable pressure vessel having a pressure vent in an upper portion thereof and a discharge port in a lower portion thereof for at least discharging cooking fat therefrom; selectively movable lid means arranged on said pressure vessel for opening and closing said vessel; a first storage container for storing cooking fat and communicating with said vessel for selective passage of cooking fat therebetween; a second storage container for storing cooking fat and communicating with said vessel and first storage container, respectively, for selective passage of cooking fat therebetween; first heating means for heating cooking fat in said first storage container prior to the passage of the cooking fat therefrom to said vessel; second heating means for heating cooking fat contained by said vessel; filtering means for filtering cooking fat prior to passage thereof from said second storage container to said first storage container; pressure-regulating means responsive to pressure in said vessel for opening said pressure vent when pressure in said vessel reaches a high pressure of about 15 p.s.i.g. and for closing said vent when said pressure in said vessel is decreased from said high pressure to a predetermined low pressure; timing means operable with said heating means for preselecting the time period of cooking; control means responsive to the pressure in said vessel during the cooking period for turning said heating means off when said high pressure is reached and for turning said heating means on when the pressure in said vessel is decreased to said low pressure; discharge means operable with said timing means for opening said discharge port at the end of the cooking period to discharge cooking fat from said vessel under the urging of steam pressure in said vessel to said second container; and purge means responsive to a preselected period of time for opening said discharge port after the cooking fat is completely discharged, to vent said vessel of all residual steam therein.

9. A deep fry pressure-cooking system as set forth in claim 8 wherein said low pressure is about 10 p.s.i.g.

10. A deep fry pressure-cooking system as set forth in claim 8 wherein said timing means is operable with said heating means for preselecting the time period of cooking and for turning off said heating means at the end of the cooking period and is responsive to the pressure in said vessel for beginning the cooking period when the pressure in the vessel first reaches said high pressure.

11. A deep fry pressure-cooking system as set forth in claim 8 wherein said pressure-regulating means is responsive to pressure in said vessel for opening said pressure vent substantially simultaneously when the pressure in said vessel reaches a predetermined high pressure and for closing said vent substantially simultaneously when the pressure in said vessel is decreased from said high pressure to a predetermined low pressure.

12. A deep fry pressure-cooking system as set forth in claim 8 including inlet means on said vessel for feeding water to said vessel; outlet means on said vessel for discharging water therefrom; means operative with said inlet and outlet means for preventing cooking fat from entering said vessel when water is used therein and for preventing water from entering said vessel when cooking fat is used therein.